US010709254B2

(12) United States Patent
Jewett et al.

(10) Patent No.: US 10,709,254 B2
(45) Date of Patent: Jul. 14, 2020

(54) BEDDING/SEATING PRODUCT WITH LOCKED CORNERS

(71) Applicant: L&P Property Management Company, South Gate, CA (US)

(72) Inventors: Jason V. Jewett, Carthage, MO (US); Seth A. Thompson, Carthage, MO (US)

(73) Assignee: L&P Property Management Company, South Gate, CA (US)

( * ) Notice: Subject to any disclaimer, the term of this patent is extended or adjusted under 35 U.S.C. 154(b) by 207 days.

(21) Appl. No.: 16/033,665

(22) Filed: Jul. 12, 2018

(65) Prior Publication Data
US 2019/0021508 A1   Jan. 24, 2019

Related U.S. Application Data

(60) Provisional application No. 62/535,465, filed on Jul. 21, 2017.

(51) Int. Cl.
    A47C 19/02   (2006.01)
    F16B 12/14   (2006.01)
    A47C 19/00   (2006.01)
    F16B 12/56   (2006.01)
    F16B 12/48   (2006.01)
    F16B 12/02   (2006.01)

(52) U.S. Cl.
    CPC .......... *A47C 19/021* (2013.01); *A47C 19/005* (2013.01); *A47C 19/025* (2013.01); *F16B 12/14* (2013.01); *F16B 12/48* (2013.01); *F16B 12/56* (2013.01); *F16B 12/02* (2013.01); *F16B 2012/145* (2013.01)

(58) Field of Classification Search
    CPC ... A47C 19/021; A47C 19/025; A47C 19/005; F16B 12/48; F16B 12/56; F16B 12/14; F16B 12/02; F16B 2012/145; F16B 12/44; F16B 12/58; F16B 12/60
    See application file for complete search history.

(56) References Cited

U.S. PATENT DOCUMENTS

| 5,709,500 A | * | 1/1998 | Mizelle ................. A47C 4/02 16/386 |
| 6,158,087 A | | 12/2000 | Cheung |
| 6,832,397 B2 | | 12/2004 | Gaboury et al. |
| D512,849 S | | 12/2005 | Mirchand |

(Continued)

*Primary Examiner* — Eric J Kurilla
*Assistant Examiner* — James T Coble
(74) *Attorney, Agent, or Firm* — Wood Herron & Evans LLP

(57) ABSTRACT

A bedding or seating product comprises a connector assembly and a stabilizer assembly at each corner of the product for joining perpendicular first and second upholstered trusses. Each stabilizer assembly comprises a first bracket secured to the first truss, a second bracket secured to the second truss and a leg assembly comprising a leg and a threaded rod. One of the first and second brackets has a threaded boss and the other of the first and second brackets has an opening aligned with the threaded boss. The threaded rod extends through the aligned threaded boss and opening of the first and second brackets and the leg abuts the first and second trusses to assist supporting the product above the ground.

22 Claims, 5 Drawing Sheets

(56) References Cited

U.S. PATENT DOCUMENTS

| | | | |
|---|---|---|---|
| 7,155,762 B2 * | 1/2007 | Harrow | A47C 19/005 5/201 |
| D542,051 S | 5/2007 | Boerner et al. | |
| D542,566 S | 5/2007 | Boerner et al. | |
| D543,051 S | 5/2007 | Kingsley et al. | |
| D599,199 S | 9/2009 | Roberts et al. | |
| 7,703,155 B1 | 4/2010 | Roberts et al. | |
| D616,291 S | 5/2010 | Roberts et al. | |
| 7,900,300 B1 | 3/2011 | Roberts et al. | |
| D637,477 S | 5/2011 | Wall | |
| D653,939 S | 2/2012 | Roberts | |
| 8,122,537 B1 | 2/2012 | Roberts | |
| 8,147,012 B2 | 4/2012 | Green | |
| 8,584,277 B1 | 11/2013 | Roberts | |
| D712,727 S | 9/2014 | Geiger | |
| D716,136 S | 10/2014 | Roberts et al. | |
| 8,850,638 B1 | 10/2014 | Suh | |
| D717,158 S | 11/2014 | Roberts et al. | |
| D719,014 S | 12/2014 | Roberts et al. | |
| D722,864 S | 2/2015 | Greenthal | |
| 8,959,678 B2 | 2/2015 | Schulz, Jr. | |
| 8,990,979 B1 * | 3/2015 | Craver | A47C 19/005 5/400 |
| D731,881 S | 6/2015 | Roberts et al. | |
| 9,080,304 B1 | 7/2015 | Roberts et al. | |
| 9,139,332 B1 | 9/2015 | Roberts et al. | |
| D753,476 S | 4/2016 | Roberts et al. | |
| 9,352,875 B1 | 5/2016 | Roberts et al. | |
| 9,422,961 B1 | 8/2016 | Roberts et al. | |
| 9,538,851 B2 | 1/2017 | Craver | |
| 2010/0031440 A1 | 2/2010 | Harrow | |
| 2016/0255963 A1 | 9/2016 | Jones | |
| 2017/0042336 A1 | 2/2017 | Craver | |
| 2017/0055715 A1 | 3/2017 | Rohr | |
| 2017/0065091 A1 | 3/2017 | Rodgers et al. | |

* cited by examiner

BEDDING/SEATING PRODUCT WITH LOCKED CORNERS

FIELD OF THE INVENTION

This invention relates generally to bedding and seating products and, more particularly, to a bedding foundation.

BACKGROUND OF THE INVENTION

Bedding and seating products often have a rectangular wooden frame comprising four or more pieces. Two of the pieces are side pieces, one is a head end piece and the last piece is a foot end piece. In some bedding foundations, the wooden pieces of the frame are oriented with the larger of their width and height dimensions facing up and down. In other bedding and seating products the frame pieces are oriented "on edge" with the lesser of their width and height dimensions facing up and down. Securing a wooden side rail oriented "on edge" to a wooden head or foot rail oriented "on edge" is difficult due to the orientation of the rails.

U.S. Pat. No. 5,709,500 discloses a connector assembly for furniture for joining adjacent pieces of rail oriented "on edge". The connector assembly comprises two connector blocks which upon assembly are joined by a tapered pin. The tapered pin fits through aligned openings in tongues of the connector blocks. The tongues of each connector block fit in openings of the other connector block. One drawback to this connector assembly is that the connector assembly is spaced above the bottom of the furniture piece. Therefore, the connector assembly does not provide as much stability to the bottom of the furniture piece as the present invention.

U.S. Pat. No. 8,990,979 discloses a leg which fits into a connector assembly like the connector assembly disclosed in U.S. Pat. No. 5,709,500. One drawback to this configuration is that the force exerted by a load on one of the legs is transferred directly to one of the connector assemblies which increases the odds of damaging one of the connector assemblies. If one of the connector assemblies is damaged, the damaged connector assembly will not support a leg. The entire product then will not be capable of functioning correctly and the product will no longer be raised off the ground by the legs. Each of the legs must work for the product to be properly supported off the ground.

It is therefore an objective of this invention to provide a bedding or seating product with legs supported by a novel structure below a connector assembly.

It is further an objective of this invention to provide a bedding or seating product having four legs, each of the legs aiding in securing together overlapping brackets at a corner of the product for stability.

SUMMARY OF THE INVENTION

According to one aspect of the present invention, a bedding or seating product incorporates a novel stabilizer assembly used to stabilize a corner of the product and receive a leg assembly to lift the product off the ground. Each corner of the product has a stabilizer assembly below a connector assembly. The combination of a connector assembly and a stabilizer assembly joins a first truss to a second truss at a corner of the product, the second truss extending generally perpendicular to the first truss. Each of the stabilizer assemblies comprises a first bracket secured to the first truss and a second bracket secured to the second truss. One of the first and second brackets has a threaded boss and the other of the first and second brackets has a non-threaded opening aligned with the threaded boss. Each of the stabilizer assemblies further comprises a leg assembly comprising a leg and a threaded rod, the threaded rod extending through the non-threaded opening and aligned threaded boss of the first and second brackets, respectively, of the stabilizer assembly. The leg has a generally planar upper portion which abuts the first and second trusses to support the trusses above the ground and provide additional stability to the trusses.

The connector assembly at each of the four corners of the product joins a first truss to a second truss the first and second trusses extending perpendicular to each other. Each connector assembly further comprises first and second connector blocks, each of the connector blocks having multiple fingers. Each of the fingers has an opening through which extends a tapered pin when the fingers are aligned.

According to another aspect of the invention, a bedding or seating product comprises a connector assembly at each of four corners of the product for joining a first truss to a second truss. Each of the connector assemblies comprises a first connector block attached to the first truss and a second connector block attached to the second truss. The first and second connector blocks each have interlocking fingers held together with a tapered pin.

A stabilizer assembly is located below the connector assembly at each of the corners of the product. Each of the stabilizer assemblies comprises a first bracket secured to the first truss and a second bracket secured to the second truss. One of the first and second brackets has a threaded boss and the other of the first and second brackets has a non-threaded opening aligned with the threaded boss.

Each stabilizer assembly further comprises a leg assembly comprising a leg and a threaded rod, the threaded rod extending through the aligned threaded boss and non-threaded opening of the first and second brackets. The leg has a generally planar upper portion upon which the first and second trusses rest to support the corner of the product above the ground and provide additional stability to the product.

According to another aspect of the invention, a bedding or seating product comprises four connector assemblies, one of the connector assemblies being at each of corners of the product for joining a first truss to a second truss. Each of the connector assemblies comprises a first connector block attached to the first truss and a second connector block attached to the second truss, the first and second connector blocks each having interlocking fingers held together with a tapered pin. The product further comprises four stabilizer assemblies, each of the stabilizer assemblies being spaced from one of the connector assemblies at one of the corners of the product. Each of the stabilizer assemblies comprises a first bracket secured to the first truss and a second bracket secured to the second truss. One of the first and second brackets has a threaded boss and the other of the first and second brackets has an opening aligned with the threaded boss. Each stabilizer assembly further comprises a leg assembly comprising a leg and a threaded rod, the threaded rod extending through the aligned threaded boss and the opening of the first and second brackets. The leg has a generally planar upper portion upon which the first and second trusses rest to support the corner of the product above the ground and provide additional stability to the product.

The accompanying drawings, which are incorporated in and constitute a part of this specification, illustrate embodiments of the invention and, together with the summary of the invention given above, and the detailed description of the drawings given below, explain the principles of the present invention.

DETAILED DESCRIPTION OF THE INVENTION

Figure 1:
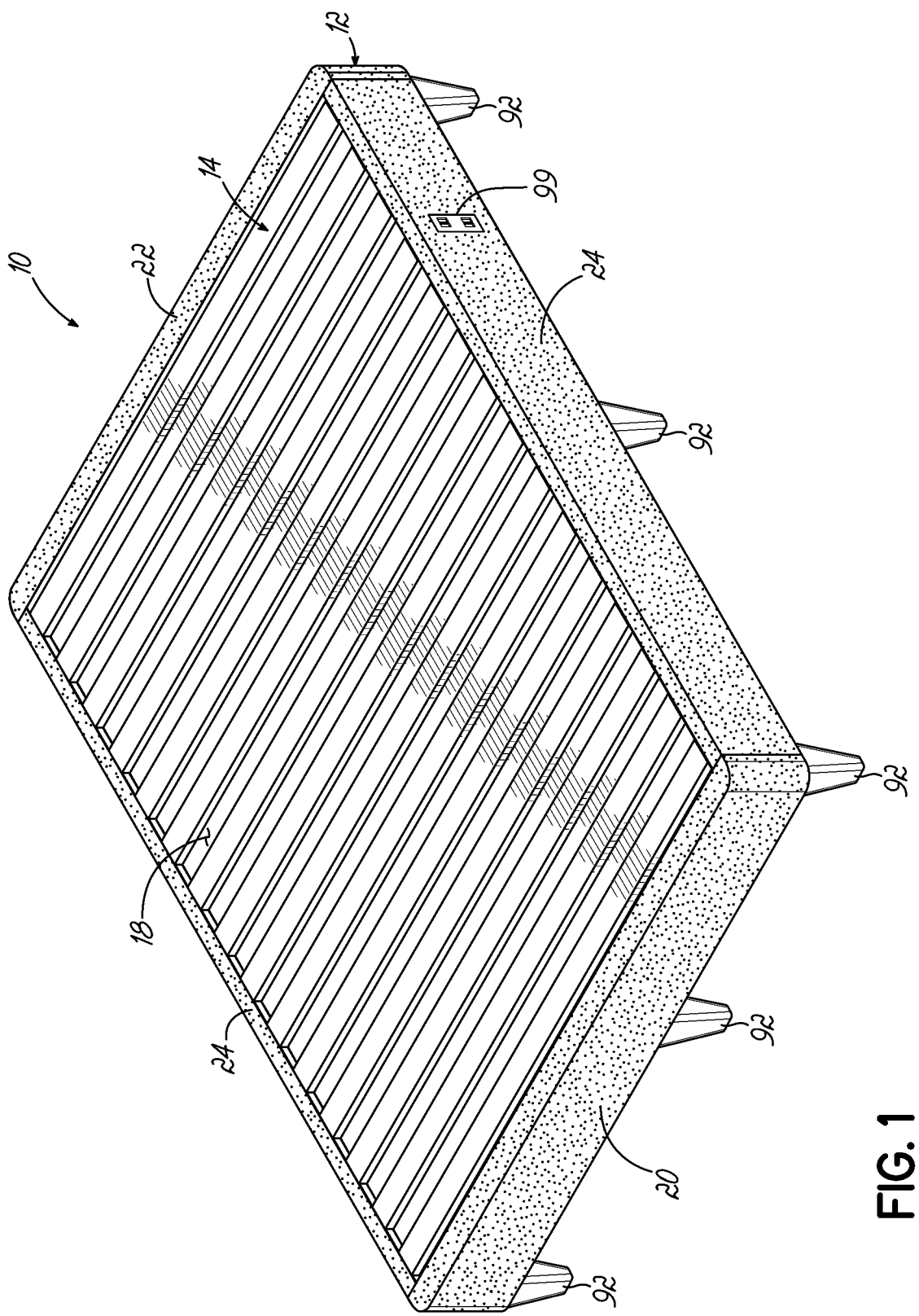
FIG. 1 is a perspective view of a bedding or seating product, in the form of a bedding foundation fully assembled.

Referring first to FIG. 1, there is illustrated a bedding product in the form of a foundation 10 incorporating the principles of the present invention. This foundation 10 comprises an upholstered frame 12 on which rests a support 14. The support 14 is illustrated as being a rollable component comprising a plurality of spaced wooden slats 16 covered in a fabric covering 18. However, the slats 16 may be made of plastic or any other suitable material. The fabric covering 18 may be omitted in some instances.

Figure 2:
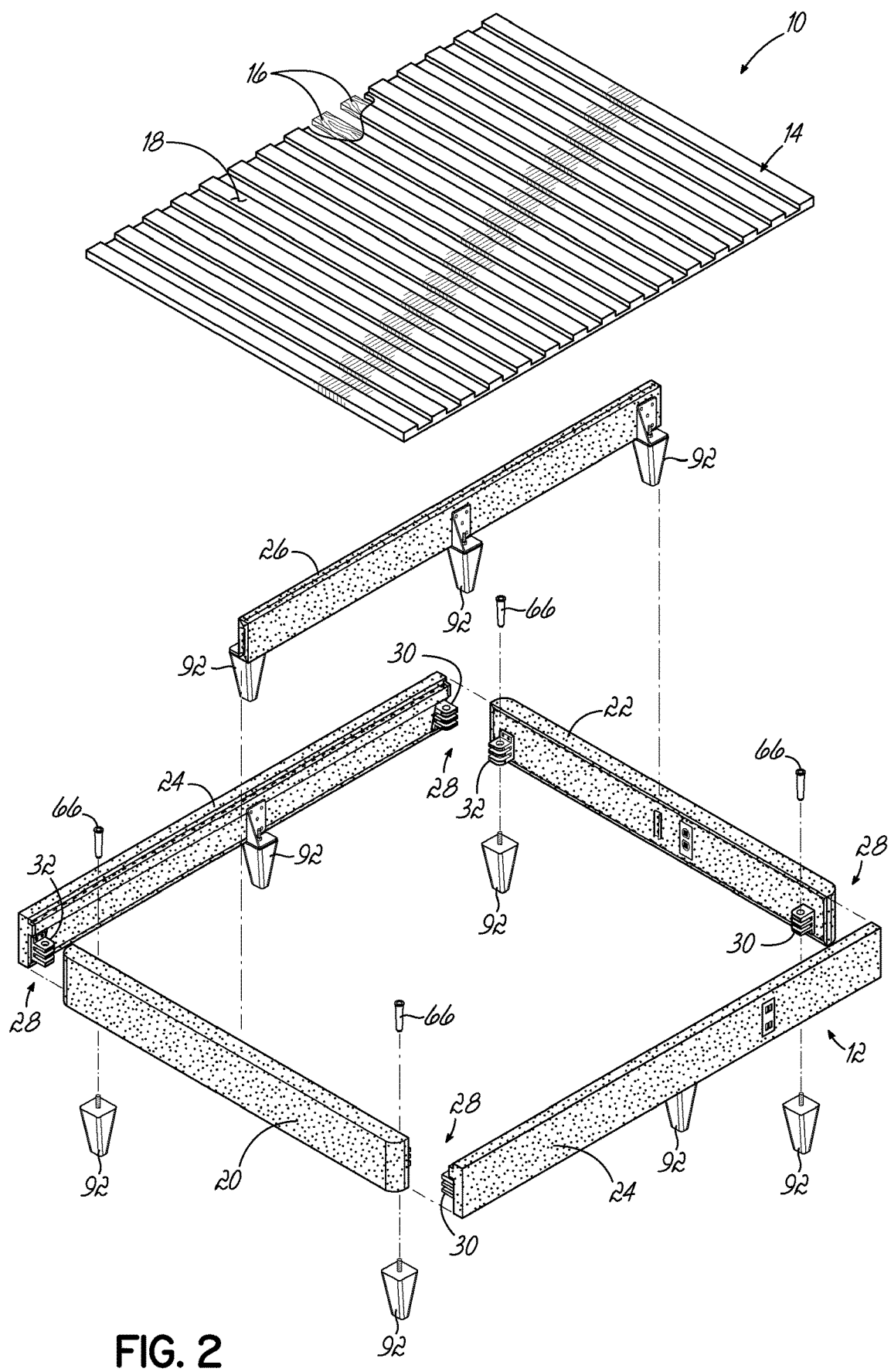
FIG. 2 is an exploded perspective view of the bedding foundation of FIG. 1.

Referring to FIG. 2, the upholstered frame 12 comprises an upholstered head truss 20, an upholstered foot truss 22, two upholstered side trusses 24 and an upholstered center truss 26. The upholstered center truss 26 is parallel the upholstered side trusses 24. The upholstered center truss 26 and upholstered side trusses 24 extend between the upholstered head truss 20 and upholstered foot truss 22. The upholstered center truss 26 is secured to the upholstered head and foot trusses 20, 22 in any known manner. Each end of each upholstered side truss 24 is secured to either the upholstered head truss 20 or the upholstered foot truss 22 with a connector assembly 28 and a stabilizer assembly 70. FIGS. 1 and 2 show the trusses upholstered while FIGS. 3-5 show the trusses without the upholstered covering.

Each connector assembly 28 comprises a first connector block 30 attached to one of the upholstered trusses 20, 22, 24 and a second connector block 32 attached to the same upholstered truss. Thus, each of the head, foot and side upholstered trusses 20, 22 and 24 has one first connector block 30 and one second connector block 32. During construction at the manufacturer's facility, the connector blocks 30, 32 and other components described below are attached to fully upholstered trusses. In other words, all the upholstered trusses are fully upholstered or covered in fabric prior to other components of the product (such as the first and second connector blocks 30, 32) being secured to the upholstered trusses.

Figure 3:
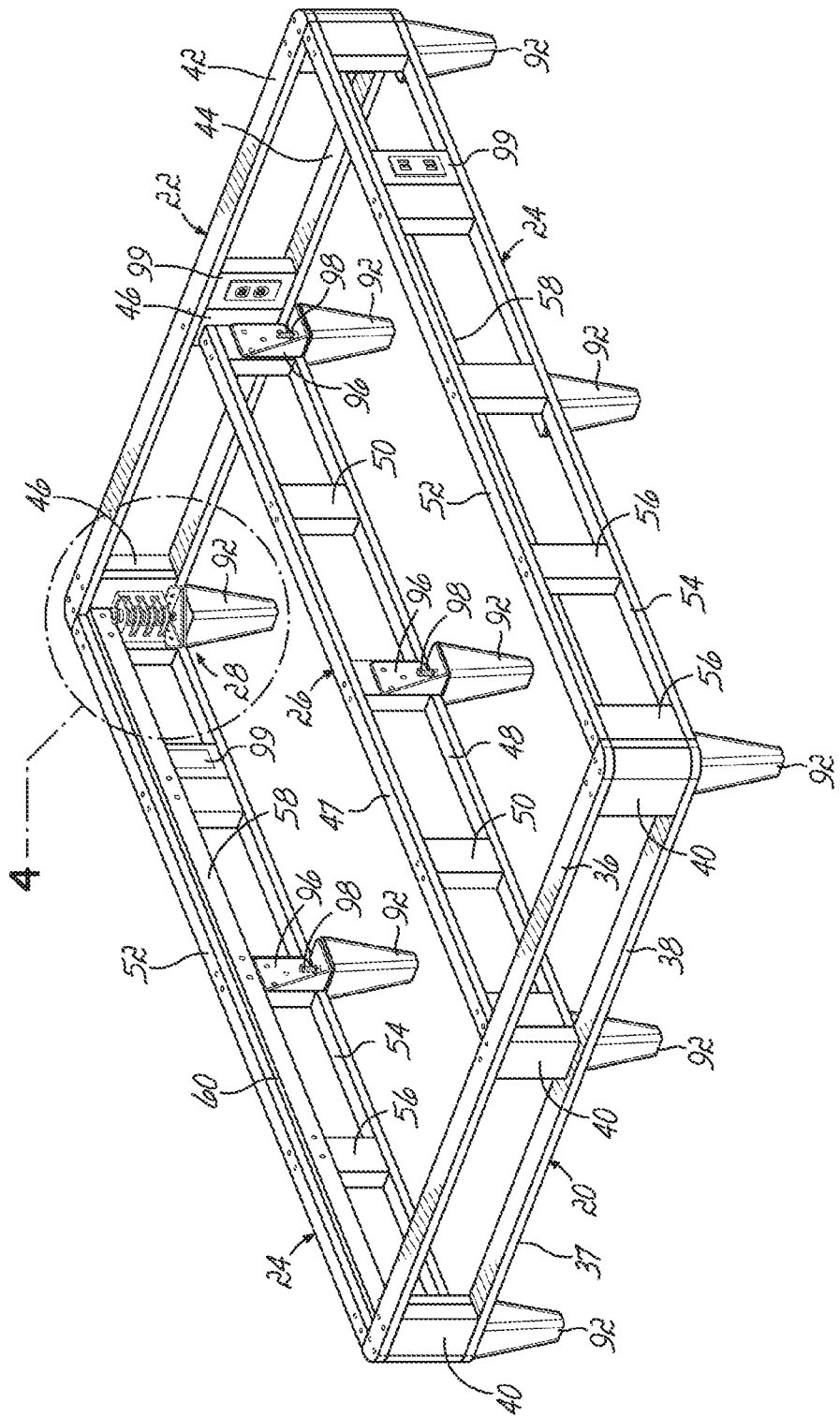
FIG. 3 is a perspective view of the bedding foundation of FIG. 1 without the upholstery.

FIG. 3 illustrates each of the upholstered trusses without an upholstered covering for understanding. The head truss 20 comprises upper and lower member 35, 38 with spacers 40 extending between the upper and lower members 34, 36. The foot truss 22 comprises upper and lower member 42, 44 with spacers 46 extending between the upper and lower members 42, 44. The center truss 26 comprises upper and lower member 47, 48 with spacers 50 extending between the upper and lower members 47, 48. Each of the side trusses 24 comprises upper and lower member 52, 54 with spacers 56 extending between the upper and lower members 52, 54. Each of the side trusses 24 further comprises an inner member 58 which when secured to the upper member 52 creates a shelf 60. Thus, each side rail 24 has a shelf 60 (only one shown in FIG. 3) extending along its length for supporting the slats 16 of support 14.

Figure 4:
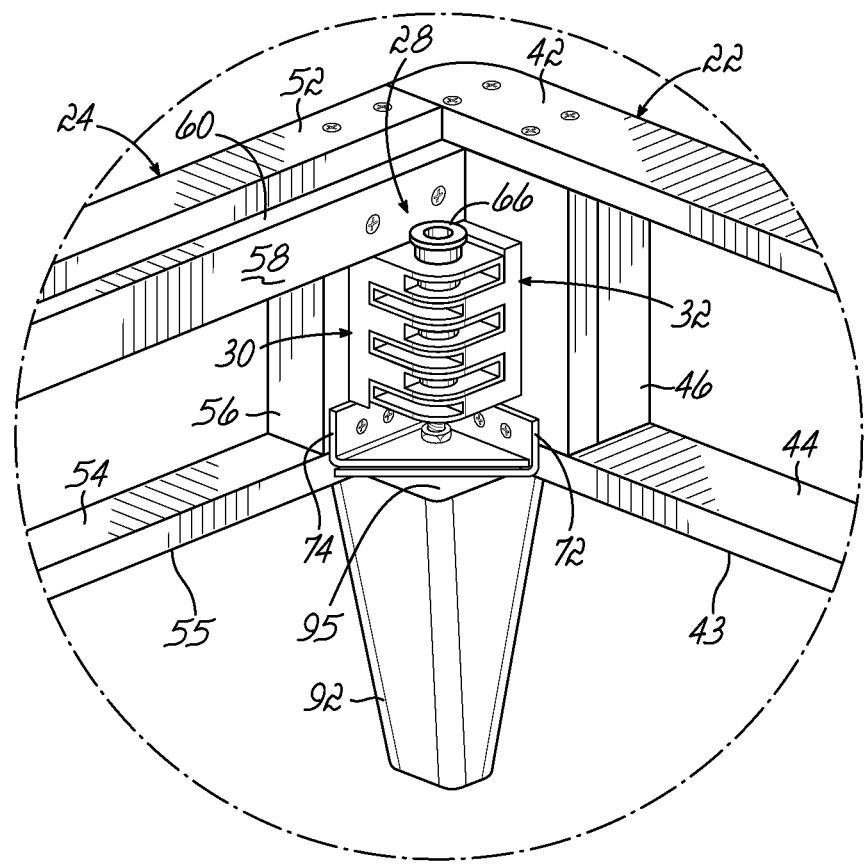
FIG. 4 is a perspective view of the encircled area 4 of FIG. 3.
Figure 5:
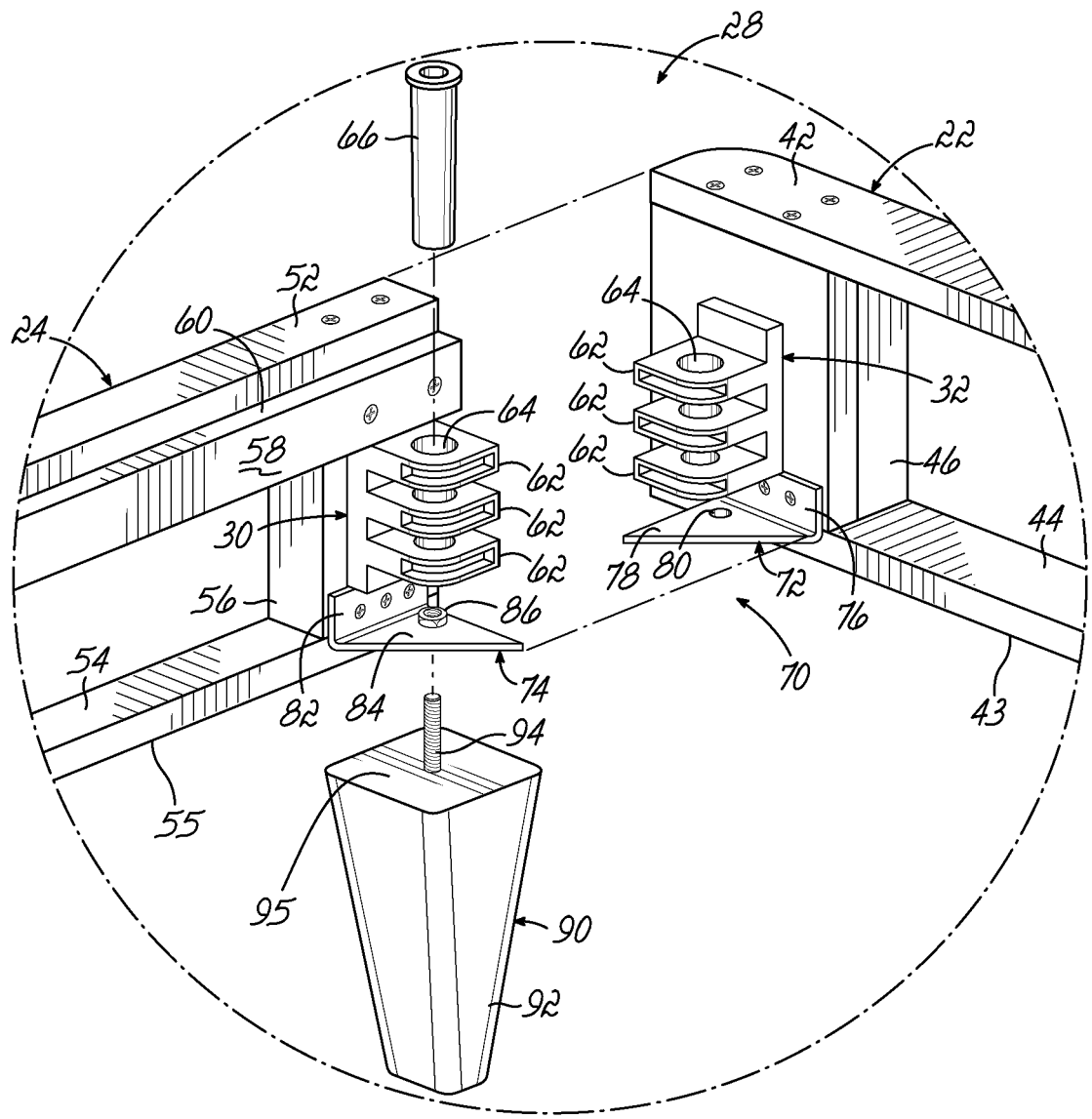
FIG. 5 is an exploded perspective view of the area of FIG. 4.

FIG. 4 illustrates the encircled area of FIG. 3 in which the foot truss 22 shown without the upholstery is attached to one of the side trusses 24 shown without the upholstery. As best shown in FIG. 5, each of the connector blocks 30, 32 has three fingers 62, each finger 62 having an opening 64 through the finger 62. A tapered pin 66 extends through the openings when the fingers are aligned as shown in FIG. 4.

As shown in FIGS. 4 and 5, the product 10 further comprises a stabilizer assembly 70 comprising a first stabilizer bracket 72 secured to the foot truss 22 and a second stabilizer bracket 74 secured to the side truss 24. The first stabilizer bracket 72 more specifically is secured to an outermost spacer 46 of the foot truss 22. The second stabilizer bracket 74 more specifically is secured to an outermost spacer 56 of the side truss 24.

As best shown in FIG. 5, the first stabilizer bracket 72 has an attachment portion 76 for securing the first stabilizer bracket 72 to the foot truss 22 and a generally triangular receiving portion 78 extending perpendicular to the attachment portion 76. The generally triangular receiving portion 78 of the first stabilizer bracket 72 also has a circular non-threaded opening 80 extending through it. Although the receiving portion 78 is illustrated as being triangular, it may be other shapes, such as a crescent shape or half-moon shape, for example.

As best shown in FIG. 5, the second stabilizer bracket 74 has an attachment portion 82 for securing the second stabilizer bracket 74 to a side truss 24 and a generally triangular receiving portion 84 extending perpendicular to the attachment portion 82. The generally triangular receiving portion 84 has a threaded boss 86 extending upwardly from the remainder of the generally triangular receiving portion 84. Although the receiving portion 84 is illustrated as being triangular, it may be other shapes, such as a crescent shape or half-moon shape, for example.

As best shown in FIG. 5, at each corner of the product is a leg assembly 90 comprising a leg 92 and a threaded rod 94. The legs 92 may be made of wood, plastic, metal or any known material. Upon assembly, the threaded rod 94 of the leg assembly 90 extends through the aligned circular non-threaded opening 80 of the first stabilizer bracket 72 and the threaded boss 86 of the second stabilizer bracket 74 which is located above the circular non-threaded opening 80 of the first stabilizer bracket 72. Thus, the threaded rod 94 of the leg assembly 90 extends first through the aligned circular non-threaded opening 80 of the first stabilizer bracket 72 and then through the threaded boss 86 of the second stabilizer bracket 74. As the threaded rod 94 of the leg assembly 90 is screwed in place, the first and second stabilizer brackets 72, 74 are cinched together, providing support for the leg assembly 90 and acting to strengthen the connection between adjacent trusses. Upon assembly, the threaded rods 94 of the leg assemblies 90 do not interact with the connector assemblies 28. The leg assemblies 90 with the stabilizer assemblies 70 may be used at each corner, regardless of whether the connector assemblies 28 as shown and described are incorporated into the product.

As best shown in FIGS. 4 and 5, an upper surface 95 of each leg 92 abuts adjoining trusses to help support the trusses and provide additional stability to the product. More specifically, the upper surface 95 of each leg 92 contacts a lower surface 55 of one of the lower members 54 of one of the side trusses 24 and contacts a lower surface 43 of one of the lower members 44 of one of the foot trusses 22 or a lower surface 37 of one of the lower members 38 of one of the head trusses 20. The configuration of the present invention transfers a portion of the load directly to adjacent trusses, reduces the stress placed on the first and second stabilizer brackets 72, 74 and reduces the stress placed on the threaded rods 94 of the leg assemblies 90.

As best shown in FIG. 3, additional brackets 96 are attached to the spacers 50 of the center rail 26. Threaded rods 94 of leg assemblies 90 are engaged with threaded bosses 98 of the additional brackets 96. In addition, one bracket 96 is secured to one of the spacers 56 of each of the side trusses 24. Although FIG. 3 shows three brackets 96 and leg assemblies 90 supporting the center rail 26 and one bracket 96 and corresponding leg assembly 90 supporting the middle of each side rail 24, any number of additional brackets 96 and leg assemblies 90 may be used as desired.

As shown in FIG. 3, electrically powered outlet blocks 99 may be located inside any of the outer trusses. The drawings are not intended to limit the number, size or location of electrically powered outlet blocks 99.

One advantage of the present invention is that a customer may receive the product in a box via the mail or a common carrier and assemble the product (such as a bedding foundation) quickly and easily resulting in a fully upholstered, attractive product without the use of tools. The upholstered trusses 20, 22, 24 and 26 are shipped to a consumer with the components (the first and second connector blocks 30, 32; the first and second stabilizer brackets 72, 74 and the leg brackets 96) already attached. To fully assemble the foundation, a consumer only has to insert the tapered pins 66 through the openings 64 in the connector blocks 30, 32 and screw in the leg assemblies 90 as described above. The four tapered pins 66 may be separately packaged and shipped with the upholstered trusses; same with the leg assemblies 90.

It is within the contemplation of the present invention that each corner of the product be made in accordance with the present invention. It is further within the scope of the present invention that the stabilizer brackets shown and described herein may be varied in size and shape as known in the art.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. The invention resides in each individual feature described herein, alone, and in all combinations of those features. Accordingly, the scope of the invention shall be limited only by the following claims and their equivalents.

What is claimed is:

1. A bedding or seating product comprising:
    a connector assembly at each of four corners of the product for joining a first truss to a second truss, the second truss extending generally perpendicular to the first truss, each connector assembly comprising first and second connector blocks, each of the connector blocks having multiple fingers, each of the fingers having an opening;
    a tapered pin extending through the openings in the fingers of the connector blocks when the fingers are aligned;
    a stabilizer assembly at each of the four corners of the product, each of the stabilizer assemblies comprising a first bracket secured to the first truss, a second bracket secured to the second truss, one of the first and second brackets having a threaded boss and the other of the first and second brackets having a non-threaded opening aligned with the threaded boss; and
    a leg assembly comprising a leg and a threaded rod, the threaded rod extending through the aligned threaded boss and non-threaded opening of the first and second brackets and the leg abutting the first and second trusses to assist supporting the product above the ground.

2. The bedding or seating product of claim 1 wherein each of the first and second brackets comprises a triangular portion.

3. The bedding or seating product of claim 1 wherein the leg is wooden.

4. The bedding or seating product of claim 1 wherein the first and second trusses are wooden.

5. The bedding or seating product of claim 1 wherein the bracket having the threaded boss is above the bracket having the non-threaded opening.

6. The bedding or seating product of claim 1 wherein each of the first and second brackets comprises an attachment portion for attaching the bracket to one of the trusses and a receiving portion generally perpendicular to the attachment portion.

7. The bedding or seating product of claim 6 wherein each of the receiving portions is triangular.

8. The bedding or seating product of claim 1 wherein at least one of the first and second trusses has an electrically powered outlet for connecting devices to the product.

9. The bedding or seating product of claim 1 wherein the first and second trusses are upholstered.

10. A bedding or seating product comprising:
    a connector assembly at each of four corners of the product for joining a first truss to a second truss, each of the connector assemblies comprising a first connector block attached to the first truss and a second connector block attached to the second truss, the first and second connector blocks each having interlocking fingers held together with a tapered pin;
    a stabilizer assembly below the connector assembly at each of the corners of the product, each of the stabilizer assemblies comprising a first bracket secured to the first truss, a second bracket secured to the second truss, one of the first and second brackets having a threaded boss and the other of the first and second brackets having a non-threaded opening aligned with the threaded boss; and
    a leg assembly comprising a leg and a threaded rod, the threaded rod extending through the aligned threaded boss and non-threaded opening of the first and second brackets and the leg abutting the first and second trusses to assist supporting the product above the ground.

11. The bedding or seating product of claim 10 wherein each of the connector assemblies is made of plastic.

12. The bedding or seating product of claim 10 wherein each of the first and second brackets of each of the stabilizer assemblies is made of metal.

13. The bedding or seating product of claim 10 wherein each of the first and second brackets comprises an attachment portion for attaching the bracket to one of the trusses and a receiving portion having one of the threaded boss and non-threaded opening.

14. The bedding or seating product of claim 13 wherein each of the receiving portions is triangular.

15. The bedding or seating product of claim 10 wherein each leg of each leg assembly is tapered.

16. A bedding or seating product comprising:
   four connector assemblies, one of the connector assemblies being at each of corners of the product for joining a first truss to a second truss, each of the connector assemblies comprising a first connector block attached to the first truss and a second connector block attached to the second truss, the first and second connector blocks each having interlocking fingers held together with a tapered pin;
   four stabilizer assemblies, each of the stabilizer assemblies being spaced from one of the connector assemblies at one of the corners of the product, each of the stabilizer assemblies comprising a first bracket secured to the first truss, a second bracket secured to the second truss, one of the first and second brackets having a threaded boss and the other of the first and second brackets having an opening aligned with the threaded boss; and
   a leg assembly comprising a leg and a threaded rod, the threaded rod extending through the aligned threaded boss and the opening of the first and second brackets and the leg abutting the first and second trusses to assist supporting the product above the ground.

17. The bedding or seating of claim 16 wherein the first bracket of each of the stabilizer assemblies is below the second bracket, the second bracket having the threaded boss.

18. The bedding or seating of claim 16 wherein the opening in the first bracket is non-threaded.

19. The bedding or seating of claim 16 wherein the opening in the first bracket is circular.

20. The bedding or seating of claim 16 wherein each of the stabilizer assemblies is below one of the connector assemblies at one of the corners of the product.

21. The bedding or seating of claim 16 wherein each of the first and second bracket of each of the stabilizer assemblies is made of metal.

22. The bedding or seating of claim 16 wherein each of the first and second connector blocks is made of plastic.

* * * * *